United States Patent
Matsubara et al.

(10) Patent No.: US 8,798,197 B2
(45) Date of Patent: Aug. 5, 2014

(54) DISTORTION COMPENSATION AMPLIFIER DEVICE AND DISTORTION COMPENSATION METHOD

(75) Inventors: Satoshi Matsubara, Kawasaki (JP); Shuya Hirata, Kawasaki (JP); Takeshi Ohba, Kawasaki (JP); Hideharu Shako, Kawasaki (JP); Jun Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 263 days.

(21) Appl. No.: 13/198,888

(22) Filed: Aug. 5, 2011

(65) Prior Publication Data

US 2012/0039415 A1 Feb. 16, 2012

(30) Foreign Application Priority Data

Aug. 13, 2010 (JP) ................................. 2010-181190

(51) Int. Cl.
*H04K 1/02* (2006.01)
*H04L 27/36* (2006.01)
*H04L 27/20* (2006.01)

(52) U.S. Cl.
CPC .............. *H04L 27/20* (2013.01); *H04L 27/368* (2013.01)
USPC .......................................... 375/297; 375/285

(58) Field of Classification Search
USPC ........................................ 375/285, 295–297
See application file for complete search history.

(56) References Cited

U.S. PATENT DOCUMENTS

| | | | |
|---|---|---|---|
| 7,012,969 B2 | 3/2006 | Ode et al. | |
| 7,129,777 B2 | 10/2006 | Kim et al. | |
| 2002/0027473 A1* | 3/2002 | Hatsugai | 330/149 |
| 2004/0017257 A1* | 1/2004 | Kim | 330/149 |
| 2005/0226346 A1* | 10/2005 | Ode et al. | 375/296 |
| 2010/0237937 A1* | 9/2010 | Nagatani et al. | 330/149 |
| 2011/0064155 A1* | 3/2011 | Ashita | 375/260 |

FOREIGN PATENT DOCUMENTS

| | | |
|---|---|---|
| JP | 2001-189685 | 7/2001 |
| JP | 2001-251148 A | 9/2001 |
| JP | 2005-117613 | 4/2005 |
| JP | 2006-253749 | 9/2006 |

* cited by examiner

*Primary Examiner* — Emmanuel Bayard
(74) *Attorney, Agent, or Firm* — Fujitsu Patent Center

(57) ABSTRACT

A distortion compensation amplifier device for compensating for distortion of a transmission signal generated by amplifying the transmission signal and for outputting the compensated transmission signal. The distortion compensation amplifier includes a storage unit that stores therein distortion compensation coefficients; a processor that performs distortion compensation processing on the transmission signal by using one of the distortion compensation coefficients; and an amplifier that amplifies the transmission signal that has been subjected to the distortion compensation processing; wherein the processor calculates an average value of the distortion compensation coefficients stored in the storage unit, and calculates the distortion compensation coefficient on the basis of the transmission signal, and the average value.

10 Claims, 15 Drawing Sheets

DISTORTION COMPENSATION AMPLIFIER DEVICE AND DISTORTION COMPENSATION METHOD

CROSS-REFERENCE TO RELATED APPLICATION

This application is based upon and claims the benefit of priority of the prior Japanese Patent Application No. 2010-181190 filed on Aug. 13, 2010, the entire contents of which are incorporated herein by reference.

FIELD

The present application relates to a distortion compensation amplifier device and a distortion compensation method.

BACKGROUND

These days, in wireless communication, high-efficiency transmission through digitization is frequently employed. If a multi-level phase modulation (phase shift keying) method is used in wireless communication, it is important that leakage of power to adjacent channels be reduced by suppressing nonlinear distortion at a transmission side particularly by linearizing amplification characteristics of a transmission power amplifier.

Also, if power efficiency is to be improved by use of an amplifier having poor linearity, a technique for compensating for nonlinear distortion generated by such an amplifier is employed.

For example, the following distortion compensation processing called "predistortion" is known. Generally, "predistortion" is carried out by generating distortion in advance of a transmission signal being amplified, by multiplying the transmission signal by a distortion compensation coefficient so as to cancel out distortion generated in an amplifier. In this distortion compensation processing, a transmission signal amplified by an amplifier is fed back and is compared with an original transmission signal. Then, the distortion compensation coefficient is updated so that the difference between the transmission signals before and after amplification is minimized. Thus, the distortion compensation coefficient converges to the optimal value, and distortion of a transmission signal generated in the amplifier is compensated for.

The distortion compensation coefficient is calculated and updated in association with each of the discrete power levels of transmission signals.

SUMMARY

A distortion compensation amplifier device for compensating for distortion of a transmission signal generated by amplifying the transmission signal and for outputting the compensated transmission signal. The distortion compensation amplifier includes a storage unit that stores therein distortion compensation coefficients; a processor that performs distortion compensation processing on the transmission signal by using one of the distortion compensation coefficients; and an amplifier that amplifies the transmission signal that has been subjected to the distortion compensation processing; wherein the processor calculates an average value of the distortion compensation coefficients stored in the storage unit, and calculates the distortion compensation coefficient on the basis of the transmission signal, and the average value.

DESCRIPTION OF EMBODIMENTS

First Embodiment

A first embodiment will be described in detail below with reference to the drawings.

Figure 1:
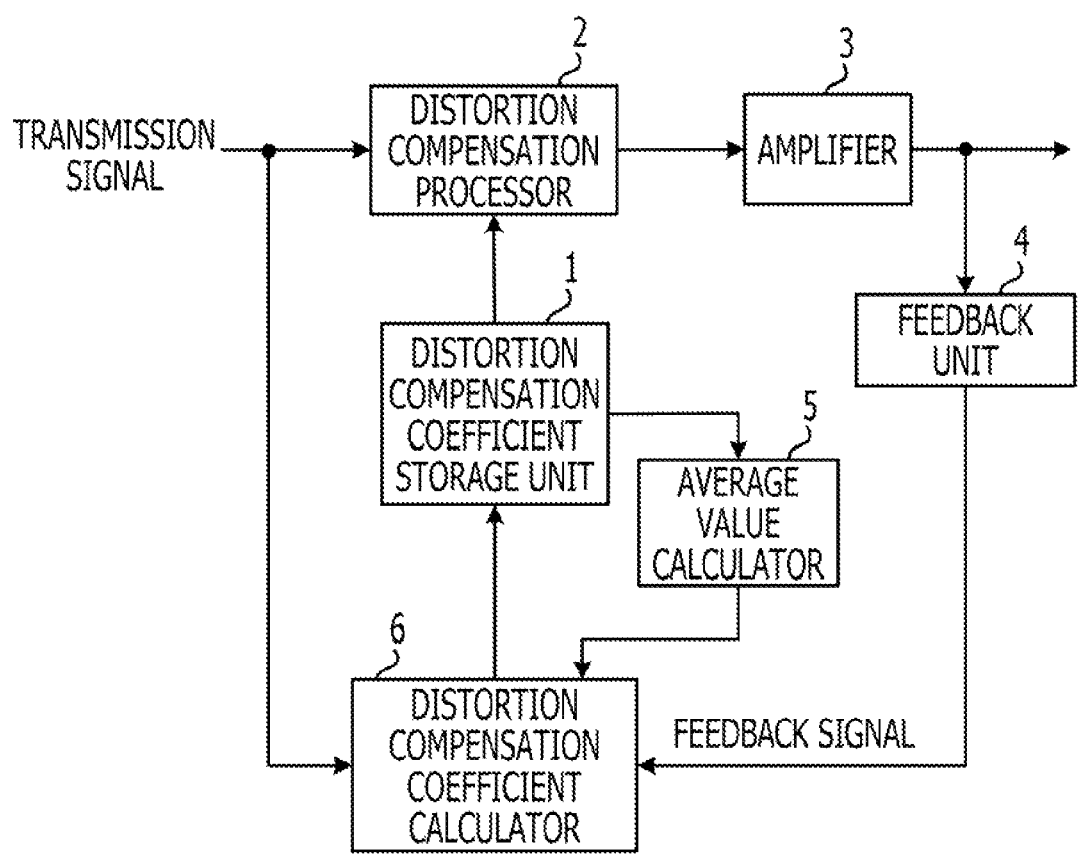
FIG. 1 illustrates an example of a distortion compensation amplifier device according to a first embodiment.

FIG. 1 illustrates an example of a distortion compensation amplifier device according to the first embodiment. The distortion compensation amplifier device includes a distortion compensation coefficient storage unit 1, a distortion compensation processor 2, an amplifier 3, a feedback unit 4, an average value calculator 5, and a distortion compensation coefficient calculator 6.

The distortion compensation coefficient storage unit 1 stores therein distortion compensation coefficients. A distortion compensation coefficient is stored in association with each of power levels of transmission signals. For example, when an address signal (not illustrated) corresponding to the power level of a transmission signal is input into the distortion compensation coefficient storage unit 1, the distortion compensation coefficient corresponding to that power level is read out from the distortion compensation coefficient storage unit 1.

The distortion compensation processor 2 performs distortion compensation processing on a transmission signal by using the distortion compensation coefficient read out from the distortion compensation coefficient storage unit 1. In the distortion compensation processor 2, the following distortion compensation processing called predistortion is performed. Prior to being amplified, a transmission signal is multiplied by the distortion compensation coefficient so as to generate distortion in advance, thereby canceling out distortion generated in the amplifier 3.

The amplifier 3 amplifies the transmission signal subjected to the distortion compensation processing.

The feedback unit 4 generates a feedback signal on the basis of the transmission signal amplified by the amplifier 3.

The average value calculator 5 calculates the average value of the distortion compensation coefficients stored in the distortion compensation coefficient storage unit 1. For example, the average value calculator 5 calculates the average value by adding the distortion compensation coefficients for all the power levels stored in the distortion compensation coefficient storage unit 1 and by dividing the total value by the total number of distortion compensation coefficients.

The distortion compensation coefficient calculator 6 calculates (updates) the distortion compensation coefficient on the basis of the transmission signal, the feedback signal, and the average value calculated by the average value calculator 5. The distortion compensation coefficient calculator 6 compares the original transmission signal with the feedback signal, and updates the distortion compensation coefficient so that the difference between the original transmission signal and the feedback signal is minimized. In this case, for example, the distortion compensation coefficient calculator 6 adds, as an offset, the average value of the distortion compensation coefficients in the direction in which the difference increases. Accordingly, the distortion compensation coefficient is increased in order to cancel a large difference, and is updated so as to converge to the optimal value. Details of the processing performed by the distortion compensation coefficient calculator 6 will be discussed later.

In the distortion compensation amplifier device configured as described above, even if a distortion compensation coefficient is updated less frequently, it can converge to an optimal value. It is thus possible to perform distortion compensation with high precision.

Figure 2:
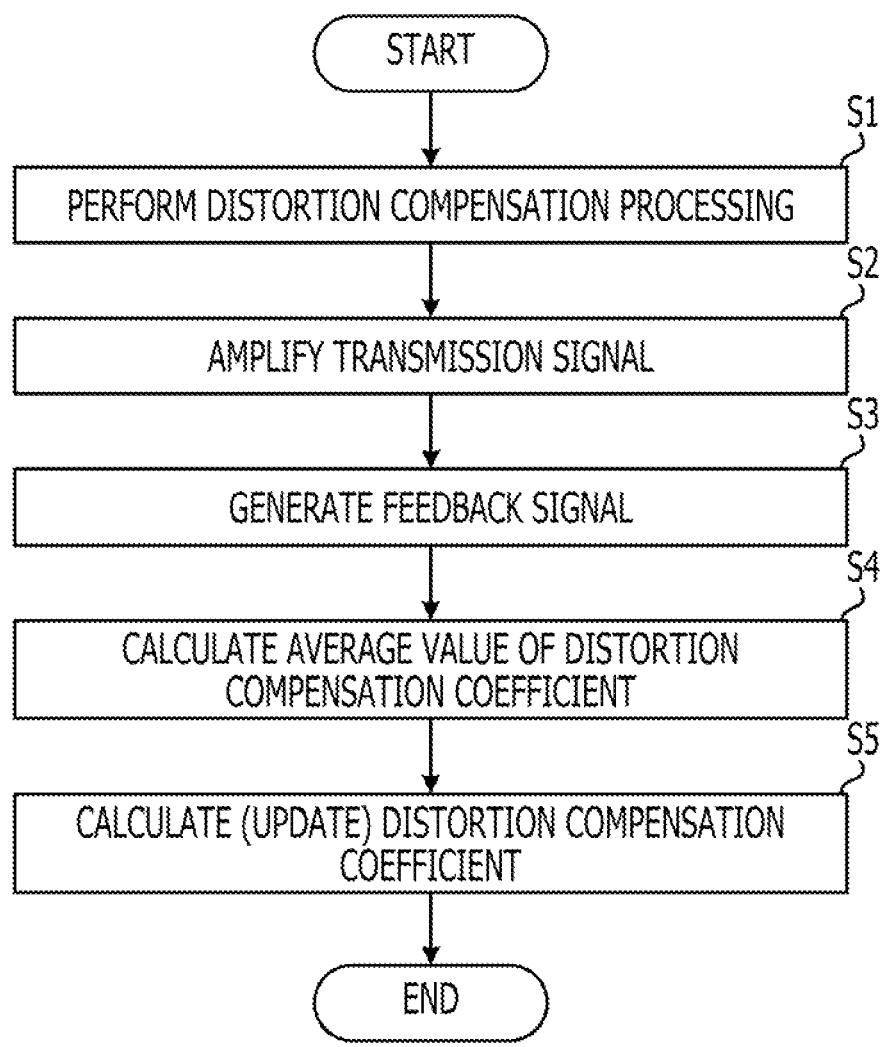
FIG. 2 is a flowchart illustrating an example of processing performed by the distortion compensation amplifier device of the first embodiment.

FIG. 2 is a flowchart illustrating an example of processing performed by the distortion compensation amplifier device of the first embodiment. The distortion compensation amplifier device repeats, for example, periodically, the processing including the following operations when a transmission signal is output.

In operation S1, the distortion compensation processor 2 performs distortion compensation processing on a transmission signal by using a distortion compensation coefficient stored in the distortion compensation coefficient storage unit 1. The transmission signal subjected to the distortion compensation processing is input into the amplifier 3.

In operation S2, the amplifier 3 amplifies the transmission signal subjected to the distortion compensation processing. The amplified transmission signal is output from the distortion compensation amplifier device and is also input into the feedback unit 4.

In operation S3, the feedback unit 4 generates a feedback signal on the basis of the transmission signal amplified by the amplifier 3 and inputs the feedback signal into the distortion compensation coefficient calculator 6.

In operation S4, the average value calculator 5 calculates the average value of the distortion compensation coefficients stored in the distortion compensation coefficient storage unit 1.

In operation S5, the distortion compensation coefficient calculator 6 calculates (updates) the distortion compensation coefficient on the basis of the transmission signal, the feedback signal, and the average value.

The calculation of the average value of the distortion compensation coefficients (operation S4) may be performed, for example, after the updating of the distortion compensation coefficient (operation S5).

In the above-described distortion compensation amplifier device and distortion compensation method, by the use of the average value of the distortion compensation coefficients stored in the distortion compensation coefficient storage unit 1, a distortion compensation coefficient can be updated so as to converge to an optimal value. Accordingly, even if the distortion compensation coefficient is updated less frequently, the distortion compensation coefficient can converge to the optimal value. It is thus possible to perform distortion compensation with high precision.

Second Embodiment

A second embodiment will now be described.

Figure 3:
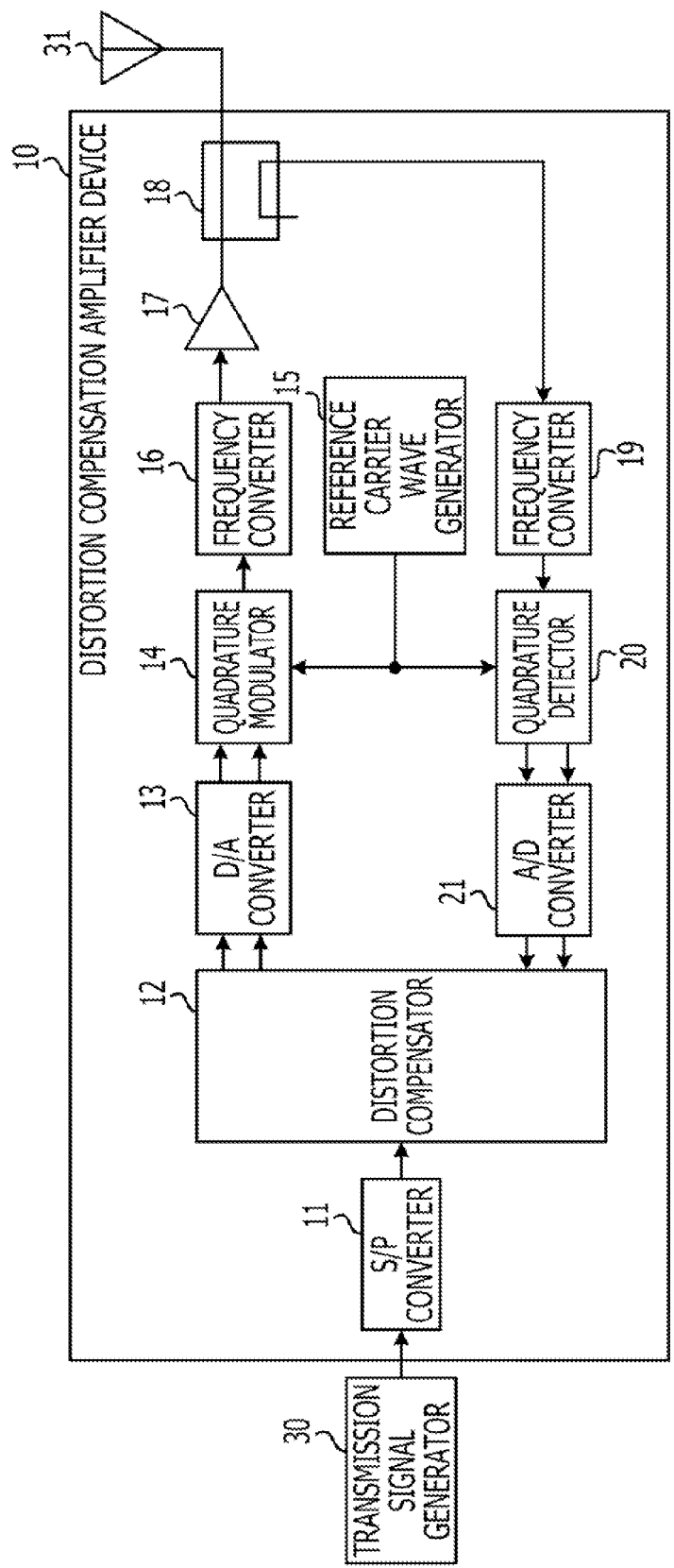
FIG. 3 illustrates an example of a distortion compensation amplifier device according to a second embodiment.

FIG. 3 illustrates an example of a distortion compensation amplifier device 10 according to the second embodiment. The distortion compensation amplifier device 10 includes a serial-to-parallel (S/P) converter 11, a distortion compensator 12, a digital-to-analog (D/A) converter 13, a quadrature modulator 14, a reference carrier wave generator 15, frequency converters 16 and 19, and an amplifier 17. The distortion compensation amplifier device 10 further includes a directional coupler 18, a quadrature detector 20, and an analog-to-digital (A/D) converter 21.

The S/P converter 11 receives a transmission signal (serial digital data string) from a transmission signal generator 30 which is disposed in, for example, a base station. The S/P converter 11 alternately allocates the digital data string bit by bit to two series of signals, i.e., the S/P converter 11 converts the digital data string into in-phase components (I signal) and quadrature components (Q signal).

The distortion compensator 12 performs distortion compensation processing (predistortion) on the transmission signal which has been converted to two series of signals by the S/P converter 11. The distortion compensator 12 functions as the distortion compensation coefficient storage unit 1, the distortion compensation processor 2, the average value calculator 5, and the distortion compensation coefficient calculator 6 illustrated in FIG. 1.

The D/A converter 13 converts the I signal and the Q signal which have been subjected to the distortion compensation processing into analog baseband signals, and inputs the analog baseband signals into the quadrature modulator 14.

The quadrature modulator 14 multiplies the I signal and the Q signal (transmission baseband signals) by a reference carrier wave and a carrier wave which is out of phase from the reference carrier wave by 90 degrees, and adds the multiplication results, thereby performing quadrature transform and outputting the quadrature modulation signal.

The reference carrier wave generator 15 generates a reference carrier wave and inputs the generated reference carrier wave into the quadrature modulator 14 and the quadrature detector 20.

The frequency converter 16 mixes the quadrature modulation signal with a local oscillation signal so as to perform frequency conversion.

The amplifier 17 amplifies the power of the signal output from the frequency converter 16 so as to transmit the amplified signal to space from an antenna 31. The amplifier 17 corresponds to the amplifier 3 illustrated in FIG. 1.

The directional coupler 18 extracts part of the signal and inputs the extracted signal to the frequency converter 19.

The frequency converter 19 performs frequency conversion on the transmission signal extracted by the directional coupler 18 so as to regenerate the quadrature modulation signal, and inputs the quadrature modulation signal into the quadrature detector 20.

The quadrature detector 20 performs quadrature detection by multiplying the quadrature modulation signal by a reference carrier wave and a signal which is out of phase from the reference carrier wave by 90 degrees so as to reproduce the baseband I signal and the baseband Q signal at the transmission side. The baseband I signal and Q signal are input into the A/D converter 21.

The A/D converter 21 converts the received I signal and Q signal into digital signals and inputs them into the distortion compensator 12.

The feedback unit 4 illustrated in FIG. 1 corresponds to the directional coupler 18, the frequency converter 19, the quadrature detector 20, and the A/D converter 21.

An example of distortion generated in the amplifier 17 will be discussed below.

Figure 4:
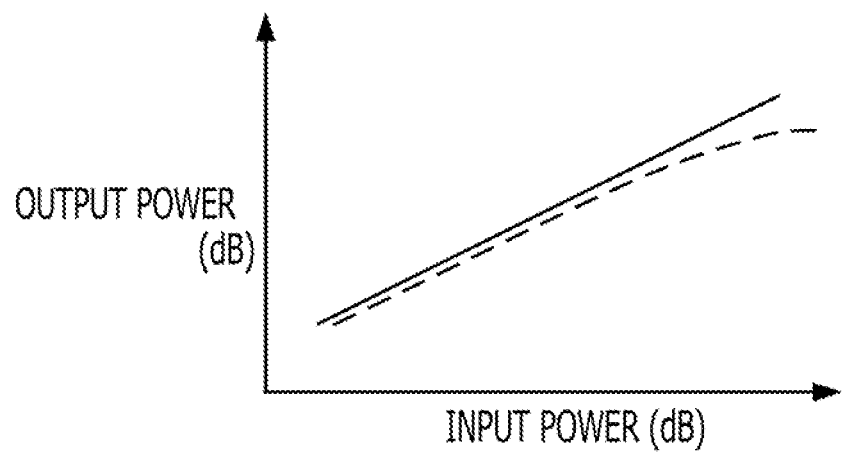
FIG. 4 illustrates an example of input/output characteristics of an amplifier.

FIG. 4 illustrates an example of input/output characteristics of the amplifier 17. The horizontal axis is input power (dB), and the vertical axis is output power (dB). The solid line indicates ideal input/output characteristics.

As indicated by the broken line in FIG. 4, as the input power increases, the input/output characteristics exhibit nonlinearity.

For example, in mobile communication, such as Wideband Code Division Multiple Access (W-CDMA) communication, transmission power of a transmission device is as high as 10 mW to several tens of W, and the input/output characteristics of the power amplifier for transmission signals are indicated by, for example, the broken line illustrated in FIG. 4.

Because of the nonlinearity of the input/output characteristics, the following nonlinear distortion is generated.

Figure 5:
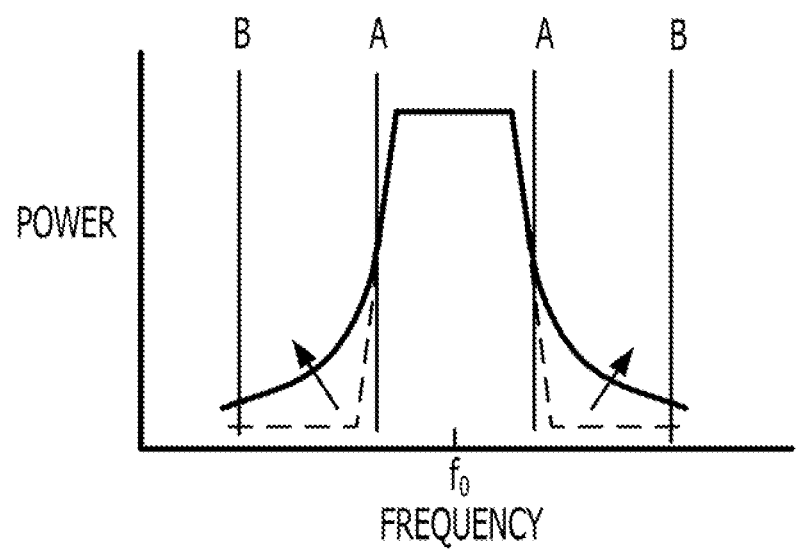
FIG. 5 illustrates an example of nonlinear distortion generated by nonlinearity of the input/output characteristics of the amplifier.

FIG. 5 illustrates an example of nonlinear distortion generated by the nonlinearity of the input/output characteristics of the amplifier. The horizontal axis is frequency, and the vertical axis is power.

The broken line indicates ideal waveform characteristics of the transmission waves in the channel between A-A lines with respect to the transmission frequency $f_0$, while the solid line indicates the waveform characteristics when nonlinear distortion is generated. When nonlinear distortion is generated, sidelobes, such as those of the waveform characteristics indicated by the solid curves (see arrows in FIG. 5), appear, and a signal leaks to an adjacent channel, thereby causing adjacent disturbances. That is, the generation of nonlinear distortion increases leakage of power of transmission waves to an adjacent frequency channel.

Adjacent Channel Power Ratio (ACPR) representing the magnitude of leakage power is determined by the ratio between power in a certain channel, which is the spectrum area between A-A lines in FIG. 5, and adjacent channel leakage power, which is the spectrum area which leaks to an adjacent channel between B-B lines. Such leakage power appears as noise for other channels, thereby deteriorating the communication quality in channels.

The distortion compensator 12 illustrated in FIG. 3 compensates for the above-described nonlinear distortion. The distortion compensator 12 includes, for example, the following elements.

Figure 6:
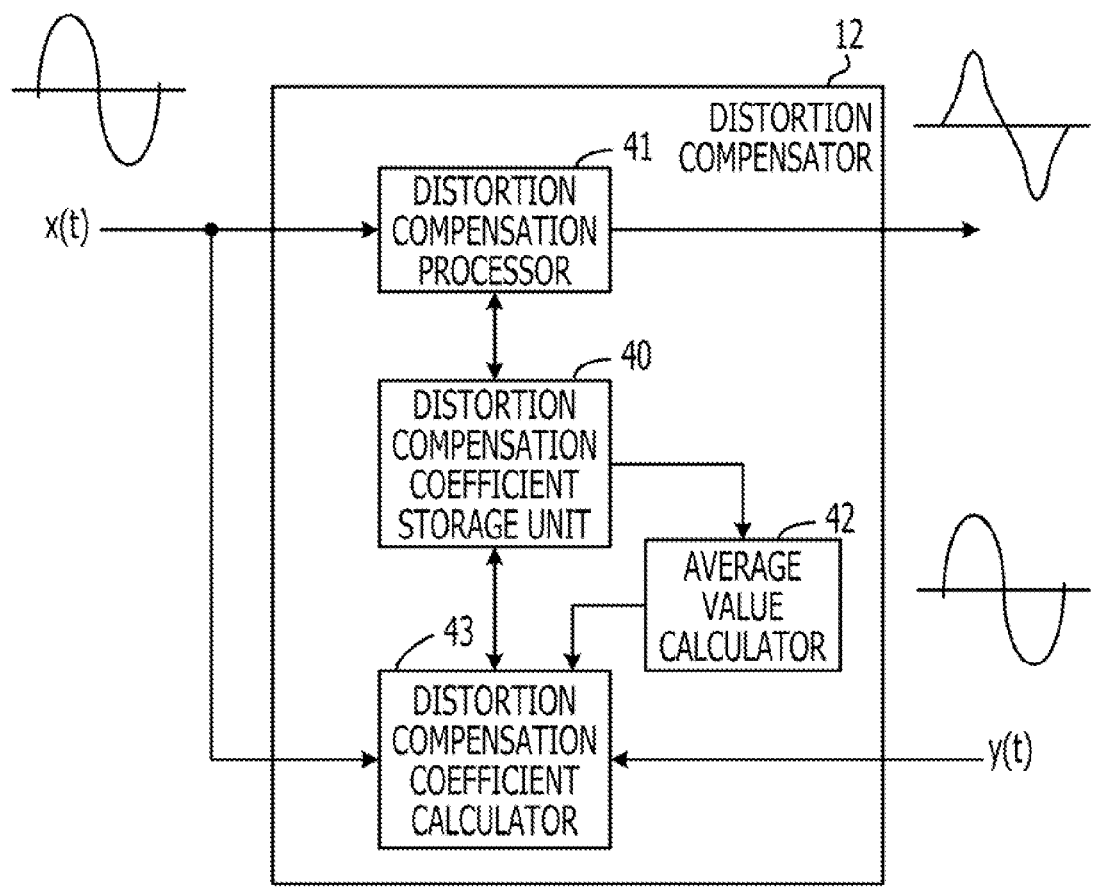
FIG. 6 illustrates an example of a distortion compensator.

FIG. 6 illustrates an example of the distortion compensator 12.

The distortion compensator 12 includes a distortion compensation coefficient storage unit 40, a distortion compensation processor 41, an average value calculator 42, and a distortion compensation coefficient calculator 43.

The distortion compensation coefficient storage unit 40 stores therein distortion compensation coefficients h(pi) corresponding to power levels pi (e.g., i=0 to 1023) of transmission signals x(t).

The distortion compensation processor 41 performs distortion compensation processing (predistortion) on a transmission signal by using a distortion compensation coefficient h(pi) corresponding to the power level of a transmission signal. With this predistortion, a waveform distorted to a greater level than the waveform of the transmission signal is obtained, as illustrated in FIG. 6.

The average value calculator 42 calculates the average value of the distortion compensation coefficients h(pi) stored in the distortion compensation coefficient storage unit 40.

The distortion compensation coefficient calculator 43 calculates (updates) the distortion compensation coefficient h(pi) on the basis of the transmission signal, the demodulation signal (feedback signal) output from the A/D converter 21 illustrated in FIG. 3, and the average value of the distortion compensation coefficients h(pi).

The distortion generated in the distortion compensation processor 41 is canceled out with the distortion generated in the amplifier 17, whereby the waveform of the feedback signal y(t) is close to the waveform of the transmission signal, as illustrated in FIG. 6.

A calculation method for the distortion compensation coefficient h(pi) will be described in greater detail, and also, the distortion compensation amplifier device 10 will be described more specifically and in greater detail.

Figure 7:
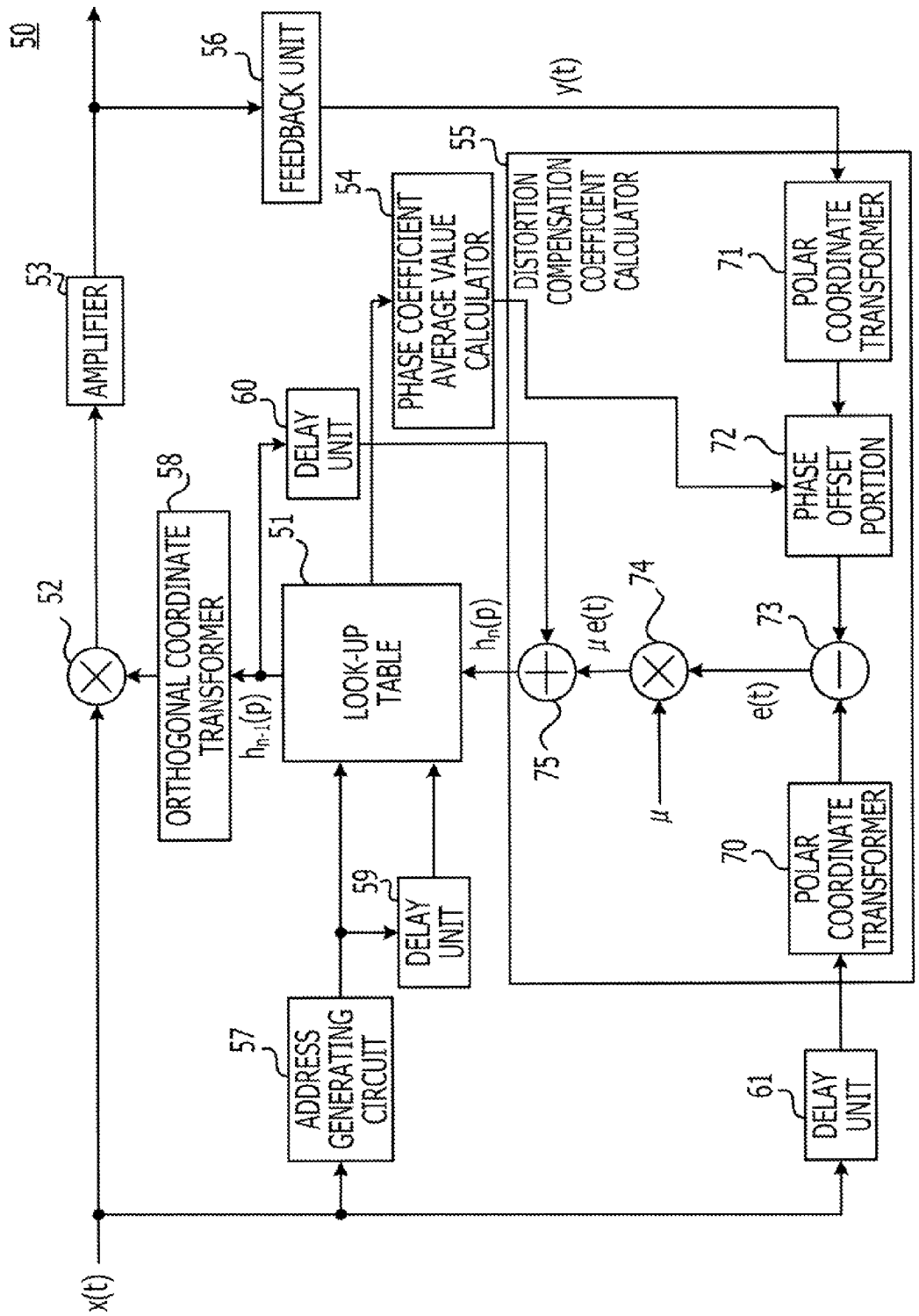
FIG. 7 illustrates a specific example of the distortion compensation amplifier device of the second embodiment.

FIG. 7 illustrates a specific example of a distortion compensation amplifier device 50 according to the second embodiment.

The distortion compensation amplifier device 50 includes a look-up table 51, a multiplier 52, an amplifier 53, a phase coefficient average value calculator 54, a distortion compensation coefficient calculator 55, a feedback unit 56, an address generating circuit 57, a orthogonal coordinate transformer 58, and delay units 59, 60, and 61.

The look-up table 51 is a specific example of the distortion compensation coefficient storage unit 40 illustrated in FIG. 6. The look-up table 51 stores therein distortion compensation coefficients used for canceling out the distortion generated in the amplifier 53, which serves as a distortion device, at two-dimensional address positions corresponding to discrete power levels of the transmission signals x(t). In the example illustrated in FIG. 7, the distortion compensation coefficients are represented by polar coordinates. In each address of the look-up table 51, an amplitude distortion compensation coefficient for compensating the amplitude components of the transmission signal x(t) and a phase distortion compensation coefficient for compensating the phase components of the transmission signal x(t) are stored.

The multiplier 52 performs predistortion by multiplying the transmission signal x(t) by the distortion compensation coefficient, which has been transformed into an orthogonal coordinate signal by the orthogonal coordinate transformer 58.

The amplifier 53 amplifies the transmission signal which has been subjected to predistortion and outputs the amplified signal.

The phase coefficient average value calculator 54 is a specific example of the average value calculator 42 illustrated in FIG. 6. The phase coefficient average value calculator 54 calculates the average value of the phase distortion compensation coefficients (hereinafter simply referred to as the "phase coefficients") stored in the look-up table 51.

The distortion compensation coefficient calculator 55 is a specific example of the distortion compensation coefficient calculator 43 illustrated in FIG. 6. The distortion compensation coefficient calculator 55 includes, as illustrated in FIG. 7, polar coordinate transformers 70 and 71, a phase offset portion 72, a subtractor 73, a multiplier 74, and an adder 75.

The polar coordinate transformer 70 transforms a transmission signal in the orthogonal coordinate system delayed by the delay unit 61 into a signal in the polar coordinate system.

The polar coordinate transformer 71 transforms the feedback signal y(t) in the orthogonal coordinate system output from the feedback unit 56 into a signal in the polar coordinate system.

When transforming a signal (I signal and Q signal) in the orthogonal coordinate system into a signal in the polar coordinate system represented by the amplitude r and the phase θ, the amplitude r is determined by the square root of the sum of the square of the power of the I signal and the square of the power of the Q signal ($I^2+Q^2$). The phase θ may be determined by referring to a table prepared in advance or by calculation using cordic algorithms.

The phase offset portion 72 subtracts the average value of the phase coefficients calculated by the phase coefficient average value calculator 54 from the phase of the feedback signal which has been transformed into the signal in the polar coordinate system.

The subtractor 73 calculates the difference signal e(t) between the transmission signal in the polar coordinate system and the feedback signal in the polar coordinate system from which the average value of the phase coefficients has been subtracted by the phase offset portion 72. The subtractor 73 calculates the difference signal e(t), for example, by subtracting the feedback signal from the transmission signal.

The multiplier 74 multiplies the difference signal t(e) by the step size parameter μ. The step size parameter μ is a parameter for decreasing the range of the distortion compensation coefficient to be updated. The step size parameter μ may be stored in a register (not illustrated), or may be input from a micro processing unit (MPU) (not illustrated).

The adder 75 adds the output μe(t) from the multiplier 74 to the distortion compensation coefficient $h_{n-1}(p)$, which is the output value from the look-up table 51 and which has been delayed by the delay unit 60 so as to determine the updated distortion compensation coefficient $h_n(p)$ (including the amplitude distortion compensation coefficient and the phase distortion compensation coefficient).

The feedback unit 56, which feeds back the output from the amplifier 53, includes, for example, the directional coupler 18, the frequency converter 19, the quadrature detector 20, and the A/D converter 21 illustrated in FIG. 3.

The address generating circuit 57 generates an address on the basis of the power level of the transmission signal x(t). More specifically, the address generating circuit 57 calculates the power $p(x^2(t))$ of the transmission signal and generates the address in the linear dimension, for example, the X-axis address, that uniquely corresponds to the calculated power p. The address generating circuit 57 also determines the difference ΔP between the power of the transmission signal x(t−1) at the previous time (t−1), which has been stored, and the power at the current time t. The address generating circuit 57 then generates another dimension which uniquely corresponds to that difference ΔP, for example, the Y-axis address.

The delay unit 59 delays the read-out address generated in the address generating circuit 57 and outputs it as a write address used for writing the distortion compensation coefficient calculated in the distortion compensation coefficient calculator 55 into the look-up table 51. The delay unit 59 delays the address because a calculation time is required for obtaining an updated value of the distortion compensation coefficient, and the delay unit 59 delays the read-out address for that calculation time, and inputs the read-out address into the look-up table 51 as the write address.

The delay unit 60 delays the distortion compensation coefficient read out from the look-up table 51 and inputs the delayed distortion compensation coefficient to the adder 75.

The delay unit 61 delays the transmission signal x(t) and inputs the delayed transmission signal x(t) to the polar coordinate transformer 70.

The delay units 60 and 61 delay the distortion compensation coefficient and the transmission signal x(t), respectively, for a period from when the transmission signal x(t) is input until when the feedback signal y(t) is input into the subtractor 73 after being subjected to various types of processing in the corresponding elements.

The operation performed by the distortion compensation amplifier device 50 will be described below.

Upon input of the transmission signal x(t), the address generating circuit 57 calculates the power level of the transmission signal x(t), and generates the read-out address corresponding to the power level, as discussed above, so as to input the generated read-out address into the look-up table 51. The distortion compensation coefficient $h_{n-1}(p)$ specified by the read-out address is extracted from the look-up table 51 and is input into the orthogonal coordinate transformer 58.

The distortion compensation coefficient $h_{n-1}(p)$ is subjected to orthogonal coordinate transform in the orthogonal coordinate transformer 58, and is input into the multiplier 52. The multiplier 52 performs predistortion by multiplying the transmission signal x(t) by the distortion compensation coefficient $h_{n-1}(p)$ subjected to the orthogonal coordinate transform processing, and inputs the result to the amplifier 53. The amplifier 53 amplifies the transmission signal x(t)×$h_{n-1}(p)$ subjected to predistortion processing and outputs the amplified signal. When the function (distortion function) representing the input/output characteristics of the amplifier 53 is f(p), the output signal of the amplifier 53 is x(t)×$h_{n-1}(p)$×f(p).

On the basis of this output signal, the feedback signal y(t) is generated by the use of the feedback unit 56, and is input into the distortion compensation coefficient calculator 55. In the distortion compensation coefficient calculator 55, the feedback signal y(t) is transformed from a signal in the orthogonal coordinate system into a signal in the polar coordinate system by use of the polar coordinate transformer 71, and is input into the phase offset portion 72.

Figure 8:
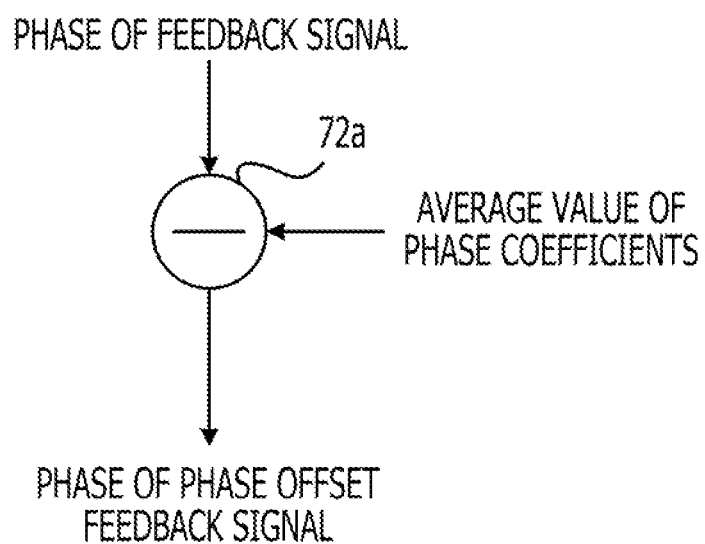
FIG. 8 illustrates an example of a phase offset portion.

FIG. 8 illustrates an example of the phase offset portion 72.

The phase offset portion 72 includes, as illustrated in FIG. 8, a subtractor 72a. The subtractor 72a subtracts the average value of the phase coefficients calculated in the phase coefficient average value calculator 54 from the phase of the feedback signal so as to generate the phase of the phase offset feedback signal.

The phase offset feedback signal is input into the subtractor 73.

Meanwhile, after the transmission signal x(t) is delayed in the delay unit 61, the transmission signal x(t) is transformed from a signal in the orthogonal coordinate system into a signal in the polar coordinate system in the polar coordinate transformer 70, and the resulting transmission signal x(t) is input into the subtractor 73. The subtractor 73 subtracts the phase offset feedback signal from the transmission signal in the polar coordinate system so as to generate the difference signal e(t), which is a signal in the polar coordinate system. The generated difference signal e(t) is input into the multiplier 74.

The multiplier 74 multiplies the input difference signal e(t) by the step size parameter μ. The output μe(t) of the multiplier 74 is input into the adder 75. The adder 75 adds the output μe(t) from the multiplier 74 to the distortion compensation coefficient $h_{n-1}(p)$ delayed in the delay unit 60 so as to output the updated distortion compensation coefficient $h_n(p)$.

In this case, in the look-up table 51, the read-out address delayed by the delay unit 59 is specified as the write address. Accordingly, the distortion compensation coefficient $h_{n-1}(p)$ is updated to the distortion compensation coefficient $h_n(p)$ calculated in the distortion compensation coefficient calculator 55.

After updating the distortion compensation coefficient, the phase coefficient average value calculator 54 updates the average value of the phase coefficients.

Figure 9:
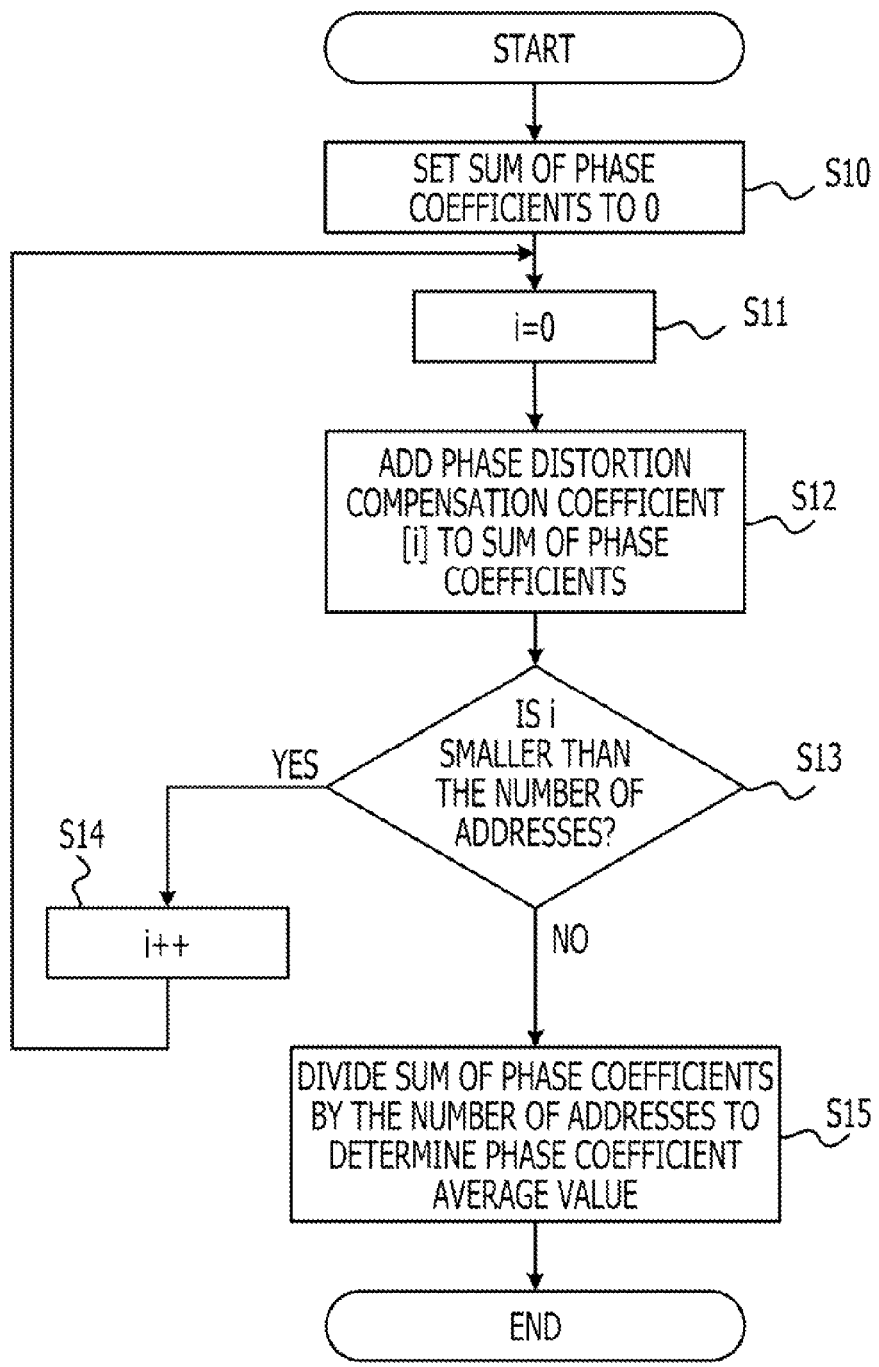
FIG. 9 is a flowchart illustrating an example of processing performed by a phase coefficient average value calculator.

FIG. 9 is a flowchart illustrating an example of processing performed by the phase coefficient average value calculator 54.

In operation S10, the phase coefficient average value calculator 54 sets the sum of the phase coefficients to be 0 as the initial condition. In operation S11, the phase coefficient average value calculator 54 sets i to be 0 (i=0). Then, in operation S12, the phase coefficient average value calculator 54 adds the phase distortion compensation coefficient [i] specified by i stored in the look-up table 51 to the sum of the phase coefficients.

Then, in operation S13, the phase coefficient average value calculator 54 determines whether i is smaller than the number of addresses in the look-up table (illustrated as LUT in FIG. 9) 51. If i is smaller than the number of addresses in the look-up table 51, in operation S14, the phase coefficient average value calculator 54 increments i. Then, the process returns to operation S12 and repeats the subsequent operations. If the phase coefficient average value calculator 54 determines in operation S13 that i is equal to or greater than the number of addresses in the look-up table 51, in operation S15, the phase coefficient average value calculator 54 divides the sum of the phase coefficients by the number of addresses in the look-up table 51, thereby calculating the average value of the phase coefficients.

The phase coefficient average value calculator 54 performs the above-described processing, for example, every time the distortion compensation coefficient is updated. By repeating the above-described processing, the distortion compensation coefficient is updated so that the difference signal e(t) is minimized and ultimately converges to the optimal distortion compensation coefficient, thereby compensating for distortion of the amplifier 53.

In the distortion compensation amplifier device 50 of this embodiment, the average value of the phase coefficients is subtracted from the phase of the feedback signal in the phase offset portion 72. By the provision of the phase offset portion 72, the phase components of the difference signal generated in the subtractor 73 are increased compared to a case where the above-described subtraction is not performed. Thus, the phase coefficient is updated so as to converge to the optimal value.

Figure 10:
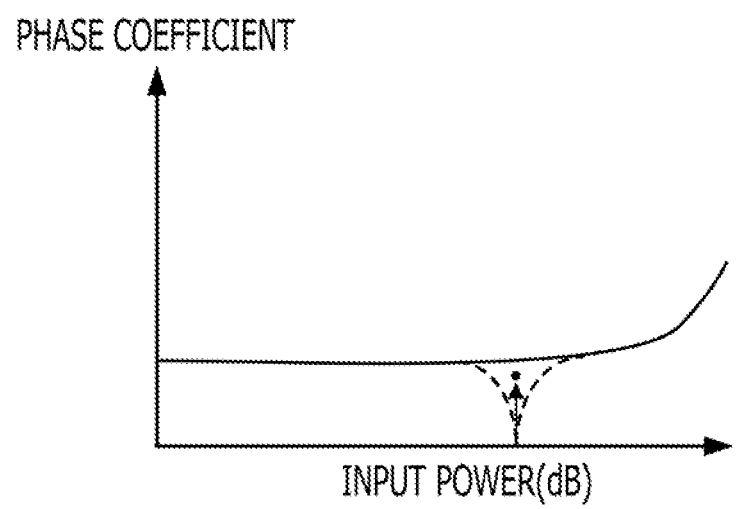
FIG. 10 illustrates an example of a phase coefficient.

FIG. 10 illustrates an example of the phase coefficient. The horizontal axis is input power (dB), and the vertical axis is phase coefficient.

The solid line indicates the ideal phase coefficient. As described above, phase coefficients, which are distortion compensation coefficients, are stored in the look-up table 51 in association with the power levels of the transmission signals x(t). The phase coefficient is updated every time the transmission signal x(t) having the corresponding power level is input. Accordingly, a phase coefficient calculated for a power level which is input many times is updated frequently and converges to the ideal phase coefficient. On the other hand, a phase coefficient calculated for a power level which is input fewer times is updated less frequently, and may deviate from the ideal phase coefficient, as indicated by the broken lines illustrated in FIG. 10.

However, in the distortion compensation amplifier device 50, as discussed above, the distortion compensation coefficient is updated so as to converge to the optimal value (ideal phase coefficient). Accordingly, even if the distortion compensation coefficient is updated less frequently, it can converge to the optimal value, as indicated by the arrow in FIG. 10. It is thus possible to perform distortion compensation with high precision.

In the distortion compensation amplifier device 50, the transmission signal x(t) and the feedback signal y(t) are transformed from signals in the orthogonal coordinate system into signals in the polar coordinate system, thereby making it possible to easily calculate the phase difference, which is represented by the difference between the transmission signal x(t) and the feedback signal y(t).

Generally, a distortion compensation amplifier device has a certain phase difference in the device as a whole. Accordingly, the phase components of distortion compensation coefficients have a certain offset which cancels out the phase difference of the device. For example, the phase coefficient is offset upward on the horizontal axis regardless of the magnitude of input power, as illustrated in FIG. 10.

Accordingly, for example, after power is input, the phase coefficient having a value of 0 converges to the optimal value indicated by the solid line in FIG. 10. However, phase coefficients in association with the power levels that are updated less frequently deviate from the optimal value, which makes it difficult to perform distortion compensation with high precision.

In the second embodiment, however, as discussed above, distortion compensation coefficients are divided into amplitude components and phase components, and the average value of the phase coefficients, which are phase components of the distortion compensation coefficients, is subtracted from the phase components of the feedback signal. Thus, the phase coefficients calculated for power levels that are updated less frequently can converge to the desired value, thereby making it possible to perform distortion compensation with high precision.

An offset may be added to all the phase coefficients of the look-up table 51 in advance. However, in a case where the device as a whole has a phase difference, even if an offset is added to all the phase coefficients, the offset phase coefficients converge to the phase coefficient that cancels out the phase difference of the device as a whole. Thus, even if an offset is added to all the phase coefficients in advance, phase coefficients calculated for power levels that are updated less frequently deviate from the optimal value after power is input.

In contrast, in the second embodiment, the average value of the phase coefficients, which are phase components of the distortion compensation coefficients, is subtracted from the phase components of the feedback signal. Accordingly, phase coefficients calculated for power levels that are updated less frequently can converge to the optimal value, thereby enabling distortion compensation with high precision.

Third Embodiment

Figure 11:
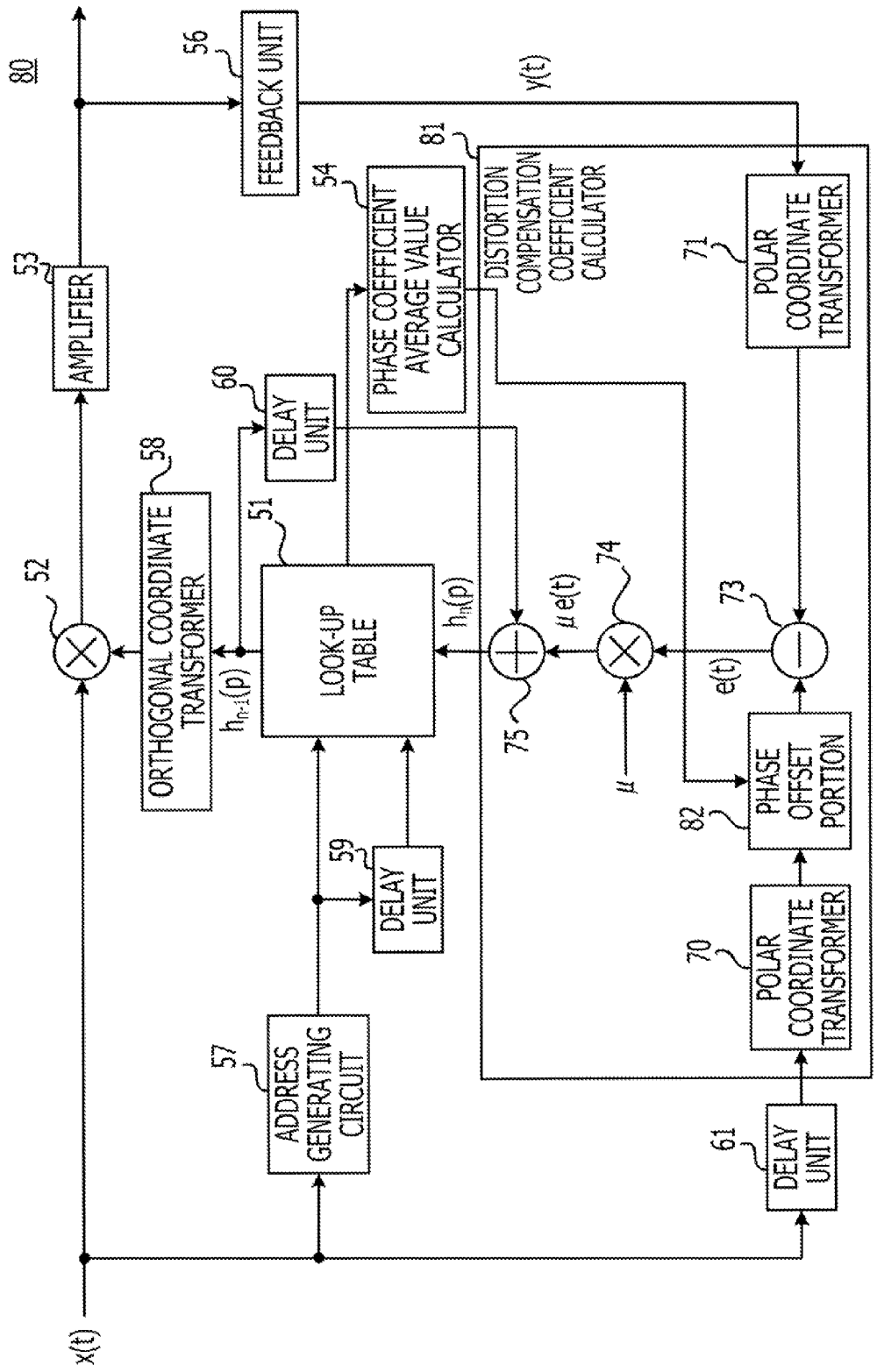
FIG. 11 illustrates a distortion compensation amplifier device of a third embodiment.

FIG. 11 illustrates a distortion compensation amplifier device 80 according to a third embodiment.

Elements the same as those of the distortion compensation amplifier device 50 illustrated in FIG. 7 are designated by like reference numerals, and an explanation thereof is thus omitted.

The distortion compensation amplifier device 80 differs from the distortion compensation amplifier device 50 in that a phase offset portion 82 of a distortion compensation coefficient calculator 81 is disposed between the polar coordinate transformer 70 and the subtractor 73.

Figure 12:
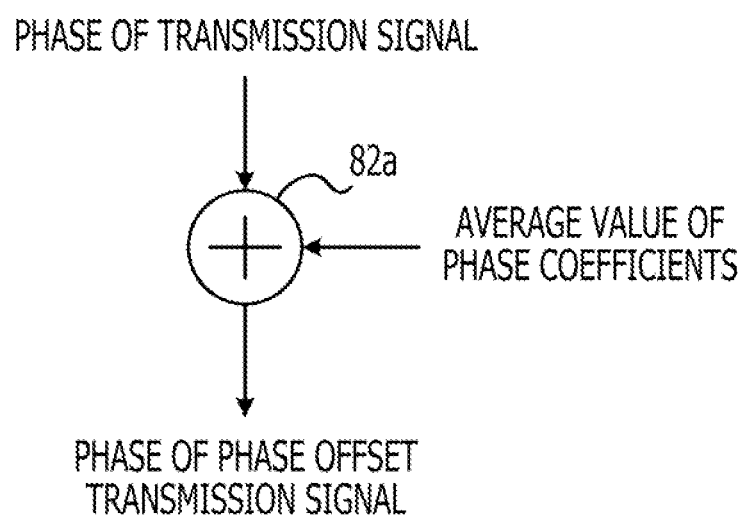
FIG. 12 illustrates an example of a phase offset portion of the distortion compensation amplifier device of the third embodiment.

FIG. 12 illustrates an example of the phase offset portion 82 of the distortion compensation amplifier device 80.

The phase offset portion 82 includes, as illustrated in FIG. 12, an adder 82a. The adder 82a adds the average value of the phase coefficients calculated in the phase coefficient average value calculator 54 to the phase of the transmission signal that has transformed into a signal in the polar coordinate system so as to generate the phase of the phase offset feedback signal.

By the provision of the phase offset portion 82, the phase components of the difference signal generated in the subtractor 73 are increased compared to a case where the phase offset portion 82 is not provided, and the distortion compensation coefficients are updated so as to converge to the optimal value (ideal phase coefficient).

Accordingly, as in the distortion compensation amplifier device 50, in the distortion compensation amplifier device 80 of the third embodiment, even if distortion compensation coefficients are updated less frequency, they can converge to the optimal value. It is thus possible to perform distortion compensation with high precision.

Fourth Embodiment

Figure 13:
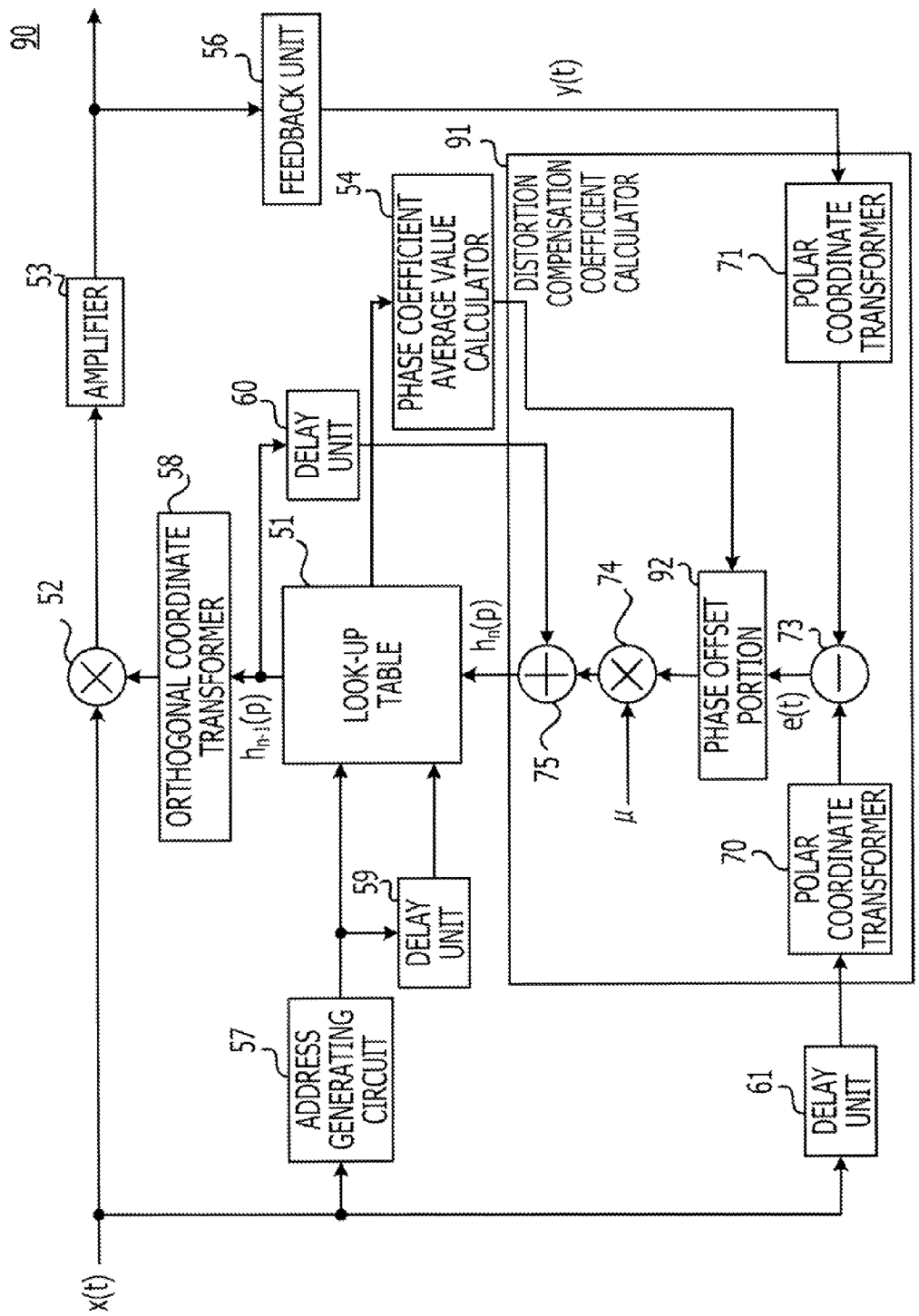
FIG. 13 illustrates a distortion compensation amplifier device of a fourth embodiment.

FIG. 13 illustrates a distortion compensation amplifier device 90 of a fourth embodiment.

Elements the same as those of the distortion compensation amplifier device 50 illustrated in FIG. 7 are designated by like reference numerals, and an explanation thereof is thus omitted.

The distortion compensation amplifier device 90 of the fourth embodiment differs from the distortion compensation amplifier device 50 illustrated in FIG. 7 in that a phase offset portion 92 of a distortion compensation coefficient calculator 91 is disposed between the subtractor 73 and the multiplier 74.

Figure 14:
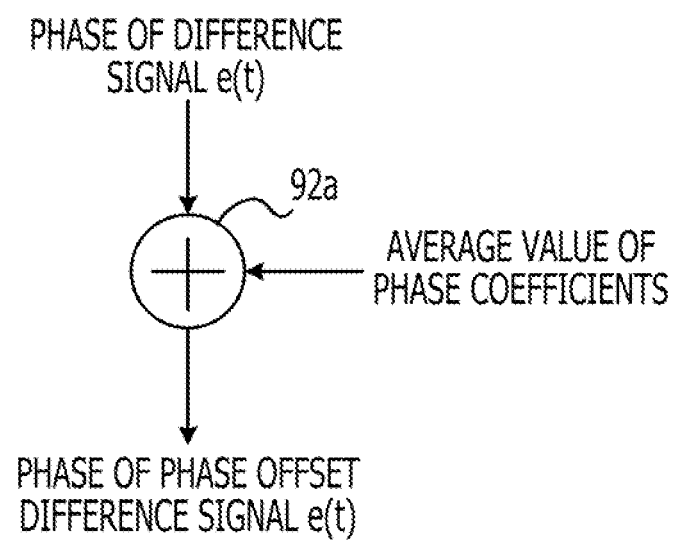
FIG. 14 illustrates an example of a phase offset portion of the distortion compensation amplifier device of the fourth embodiment.

FIG. 14 illustrates an example of the phase offset portion 92 of the distortion compensation amplifier device 90.

The phase offset portion 92 includes, as illustrated in FIG. 12, an adder 92a. The adder 92a adds the average value of the phase coefficients calculated in the phase coefficient average value calculator 54 to the phase of the difference signal e(t) output from the subtractor 73 so as to generate the phase of the phase offset difference signal e(t).

Because of the provision of the phase offset portion 92, the phase components of the difference signal are increased compared to a case where the phase offset portion 92 is not provided. Thus, the distortion compensation coefficients are updated so as to converge to the optimal value (ideal phase coefficients).

Accordingly, as in the distortion compensation amplifier device 50, in the distortion compensation amplifier device 90 of the fourth embodiment, even if the distortion compensation coefficients are updated less frequency, they can converge to the optimal value. It is thus possible to perform distortion compensation with high precision.

In the above-described embodiments, the subtractor 73 subtracts the feedback signal from the transmission signal. Alternatively, the subtractor 73 may subtract the transmission signal from the feedback signal. In this case, an adder may be used instead of the subtractor 72a illustrated in FIG. 8, or a subtractor may be used instead of the adder 82a illustrated in FIG. 12 or the adder 92a illustrated in FIG. 14. In this manner, arithmetic units may suitably be changed.

Hardware Example of Distortion Compensation Amplifier Device

The distortion compensation amplifier devices of the first through fourth embodiments are implemented by, for example, the following hardware.

Figure 15:
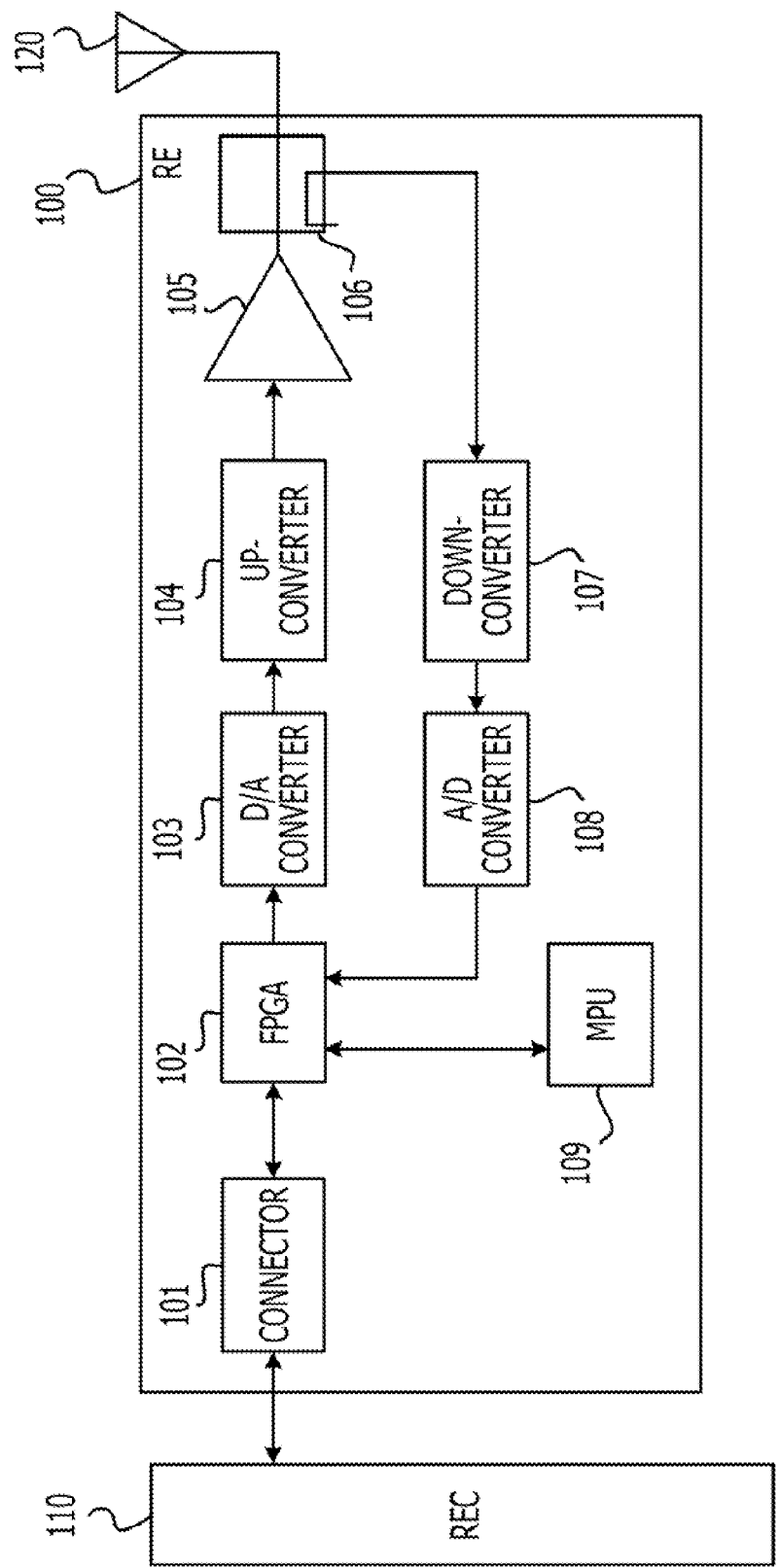
FIG. 15 illustrates a hardware example of a distortion compensation amplifier device.

FIG. 15 is a hardware example of a distortion compensation amplifier device.

The distortion compensation amplifier device is implemented by, for example, radio equipment (RE) 100 illustrated in FIG. 15. The RE 100 includes a connector 101, a field programmable gate array (FPGA) 102, a D/A converter 103, an up-converter 104, and an amplifier 105. The RE 100 also includes, as a feedback system, a directional coupler 106, a down-converter 107, an A/D converter 108, and an MPU 109 that controls the entire RE 100.

The connector 101 is an electrical connector or an optical connector through which communication is performed between the RE 100 and a radio equipment controller (REC) 110 installed in a base station. The connector 101 functions as the S/P converter 11 illustrated in FIG. 3.

The FPGA 102 has a built-in MPU, and implements the function of the distortion compensator 12 illustrated in FIG. 3.

The D/A converter 103 and the A/D converter 108 correspond to the D/A converter 13 and the A/D converter 21, respectively, illustrated in FIG. 3.

The up-converter 104 functions as the quadrature modulator 14, the reference carrier wave generator 15, and the frequency converter 16 illustrated in FIG. 3.

The amplifier 105 and the directional coupler 106 correspond to the amplifier 17 and the directional coupler 18, respectively, illustrated in FIG. 3.

The down-converter 107 functions as the reference carrier wave generator 15, the frequency converter 19, and the quadrature detector 20 illustrated in FIG. 3.

The MPU 109 controls the entire RE 100. For example, the MPU 109 generates a signal that causes the FPGA 102 to start processing.

In the above-described RE 100, the FPGA 102 updates distortion compensation coefficients discussed in the first through fourth embodiments, and performs predistortion on a transmission signal input via the connector 101, thereby compensating for distortion generated in the amplifier 105 with high precision. The distortion compensated transmission signal is output from an antenna 120.

The above-described hardware is an example only, and instead of the FPGA 102, another device, such as a digital signal processor (DSP) or an application specific integrated circuit (ASIC), may be used.

A description has been given, on the basis of the embodiments, of one aspect of the distortion compensation amplifier device and distortion compensation method of the present invention. Those embodiments are examples only, and the present invention is not restricted to the disclosed embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation amplifier device for compensating for distortion of a transmission signal generated by amplifying the transmission signal and for outputting the compensated transmission signal, comprising:
 a storage unit that stores therein distortion compensation coefficients;
 a processor that performs distortion compensation processing on the transmission signal by using one of the distortion compensation coefficients; and
 an amplifier that amplifies the transmission signal that has been subjected to the distortion compensation processing;
 wherein the processor calculates an average value of the distortion compensation coefficients stored in the storage unit, and calculates the distortion compensation coefficient on the basis of the transmission signal, and the average value;
 wherein the distortion compensation coefficients include amplitude distortion compensation coefficients for compensating amplitude components of the transmission signal and phase distortion compensation coefficients for compensating phase components of the transmission signal, and the processor further calculates an average value of the phase distortion compensation coefficients.

2. The distortion compensation amplifier device according to claim 1, wherein the processor adds or subtracts the average value of the phase distortion compensation coefficients to or from phase components of a feedback signal generated from the transmission signal, and calculates the amplitude distortion compensation coefficient and the phase distortion compensation coefficient on the basis of the transmission signal and the feedback signal to or from which the average value of the phase distortion compensation coefficients has been added or subtracted.

3. The distortion compensation amplifier device according to claim 1, wherein the processor adds or subtracts the average value of the phase distortion compensation coefficients to or from phase components of the transmission signal, and calculates the amplitude distortion compensation coefficient and the phase distortion compensation coefficient on the basis of and the transmission signal to or from which the average value of the phase distortion compensation coefficients has been added or subtracted.

4. The distortion compensation amplifier device according to claim 1, wherein the processor calculates the amplitude distortion compensation coefficient and the phase distortion compensation coefficient on the basis of a difference signal between the transmission signal and a feedback signal generated from the transmission signal, the average value of the phase distortion compensation coefficients being added to or subtracted from phase components of the difference signal.

5. The distortion compensation amplifier device according to claim 1, wherein the processor transforms the transmission signal and a feedback signal generated from the transmission signal from signals in an orthogonal coordinate system into signals in a polar coordinate system, and calculates a difference signal between the transmission signal and the feedback signal that have been transformed into the signals in the polar coordinate system.

6. A distortion compensation method for compensating for distortion of a transmission signal generated by amplifying the transmission signal and for outputting the compensated transmission signal, comprising:
 performing, by a processor, distortion compensation processing on the transmission signal by using one of distortion compensation coefficients stored in a storage unit;
 amplifying, by an amplifier, the transmission signal that has been subjected to the distortion compensation processing;
 calculating, by the processor, an average value of the distortion compensation coefficients stored in the storage unit; and
 calculating, by the processor, the distortion compensation coefficient on the basis of the transmission signal, and the average value;
 wherein the distortion compensation coefficients include amplitude distortion compensation coefficients for compensating amplitude components of the transmission signal and phase distortion compensation coefficients for compensating phase components of the transmission signal, and the processor further calculates the average value of the phase distortion compensation coefficients.

7. The distortion compensation method according to claim 6, wherein the processor adds or subtracts the average value of the phase distortion compensation coefficients to or from phase components of a feedback signal generated from the transmission signal, and calculates the amplitude distortion compensation coefficient and the phase distortion compensation coefficient on the basis of the transmission signal and the feedback signal to or from which the average value of the phase distortion compensation coefficients has been added or subtracted.

8. The distortion compensation method according to claim 6, wherein the processor adds or subtracts the average value of the phase distortion compensation coefficients to or from phase components of the transmission signal, and calculates the amplitude distortion compensation coefficient and the phase distortion compensation coefficient on the basis of the transmission signal to or from which the average value of the phase distortion compensation coefficients has been added or subtracted.

9. The distortion compensation method according to claim 6, wherein the processor calculates the amplitude distortion compensation coefficient and the phase distortion compensation coefficient on the basis of a difference signal between the transmission signal and a feedback signal generated from the transmission signal, the average value of the phase distortion compensation coefficients being added to or subtracted from phase components of the difference signal.

10. The distortion compensation method according to claim 6, wherein the processor transforms the transmission signal and a feedback signal generated from the transmission signal from signals in an orthogonal coordinate system into signals in a polar coordinate system, and calculates a difference signal between the transmission signal and the feedback signal that have been transformed into the signals in the polar coordinate system.

* * * * *